US009906325B2

(12) United States Patent
Ohana et al.

(10) Patent No.: US 9,906,325 B2
(45) Date of Patent: Feb. 27, 2018

(54) SIMPLIFIED MULTI-MODULATION CODING SET (MCS) OR MULTIPLE PROFILE TRANSMISSION (MPT) SCHEME FOR COMMUNICATIONS

(71) Applicant: BROADCOM CORPORATION, Irvine, CA (US)

(72) Inventors: Yitshak Ohana, Givat Zeev (IL); Avi Kliger, Ramat Gan (IL); Thomas J. Kolze, Phoenix, AZ (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 534 days.

(21) Appl. No.: 14/072,991

(22) Filed: Nov. 6, 2013

(65) Prior Publication Data

US 2014/0126345 A1 May 8, 2014

Related U.S. Application Data

(60) Provisional application No. 61/722,927, filed on Nov. 6, 2012, provisional application No. 61/723,258, filed on Nov. 6, 2012.

(51) Int. Cl.
*H04L 1/00* (2006.01)
*H04L 27/26* (2006.01)

(52) U.S. Cl.
CPC .......... *H04L 1/0003* (2013.01); *H04L 1/0009* (2013.01); *H04L 27/2602* (2013.01);
(Continued)

(58) Field of Classification Search
None
See application file for complete search history.

(56) References Cited

U.S. PATENT DOCUMENTS

2009/0122874 A1\* 5/2009 Kolze .................... H04H 20/69
375/240.24
2009/0254794 A1\* 10/2009 Malik .................. H04L 1/0041
714/776

(Continued)

*Primary Examiner* — Marcus R Smith
(74) *Attorney, Agent, or Firm* — Garlick & Markison; Shayne X. Short

(57) ABSTRACT

A communication device includes a media access control (MAC) and a physical layer (PHY) processor and supports multi-profile communications with one or more other communication devices. The PHY processor selects a profile based on one or more characteristics of a communication pathway between the device and the one or more other communication devices. A profile may include operational parameters such as modulation coding set (MCS), forward error correction (FEC) and/or error correction code (ECC), a number of bits per symbol per sub-carrier and/or sub-carrier mapping (e.g., such as based on orthogonal frequency division multiplexing (OFDM) or orthogonal frequency division multiple access (OFDMA)), cyclic prefix, channel(s) used in transmission, bit-filling and shortening, unicast and/or multicast transmission, and/or other operational parameters. The PHY processor also may be configured to operate within at least two different operational modes including a first mode of packet aggregation and a second mode of bit-filling and shortening.

20 Claims, 9 Drawing Sheets

(52) U.S. Cl.
CPC .......... *H04L 1/0057* (2013.01); *H04L 1/0068* (2013.01); *H04L 1/0071* (2013.01)

(56) References Cited

U.S. PATENT DOCUMENTS

| | | | |
|---|---|---|---|
| 2011/0149760 A1* | 6/2011 | Shrivastava .......... | H04L 1/0003 370/252 |
| 2011/0164514 A1* | 7/2011 | Afkhamie .......... | H04W 52/367 370/252 |
| 2013/0236177 A1* | 9/2013 | Fang .................. | H04L 12/2801 398/66 |
| 2013/0343753 A1* | 12/2013 | Pietsch .................. | H04J 14/08 398/41 |
| 2015/0288452 A1* | 10/2015 | Stupar ................ | H04L 12/2885 398/58 |
| 2015/0304125 A1* | 10/2015 | Nee .......................... | H04L 5/16 370/294 |

* cited by examiner

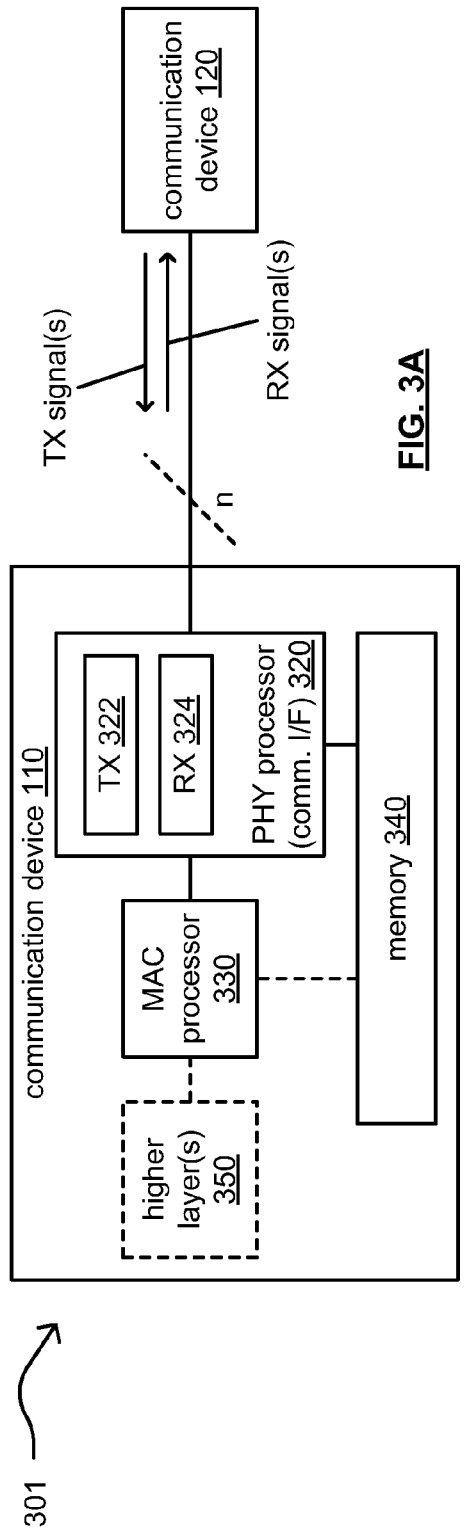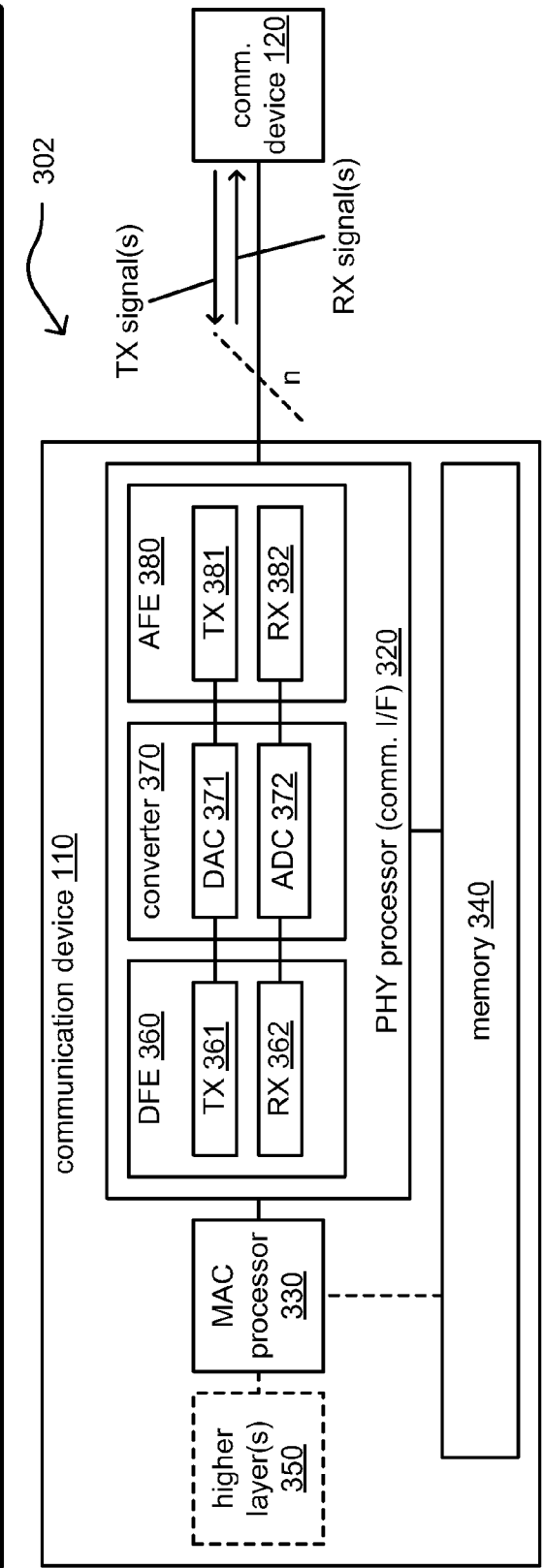

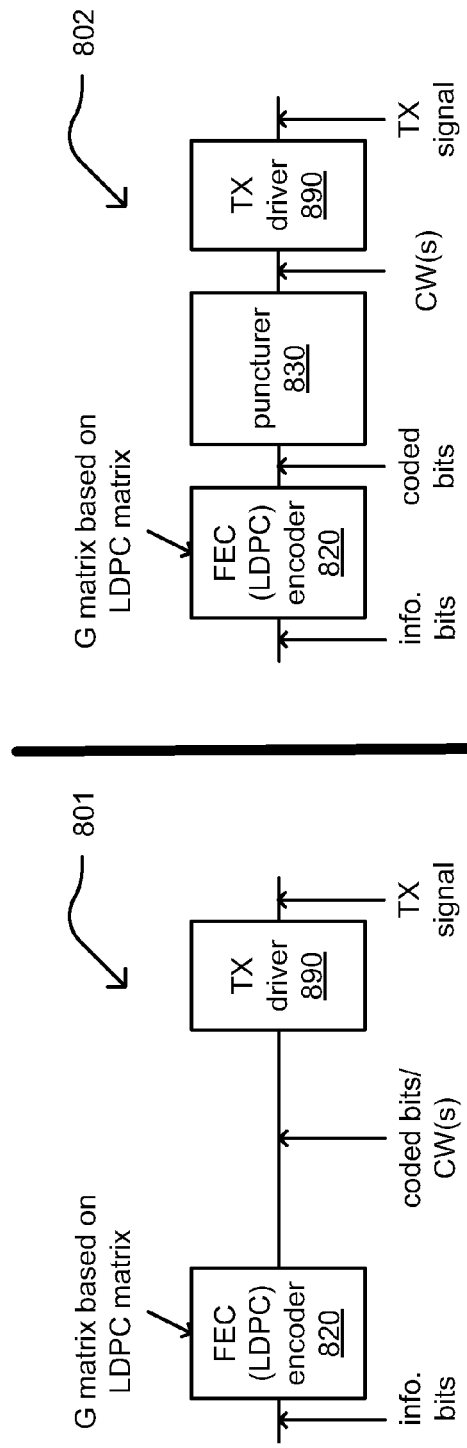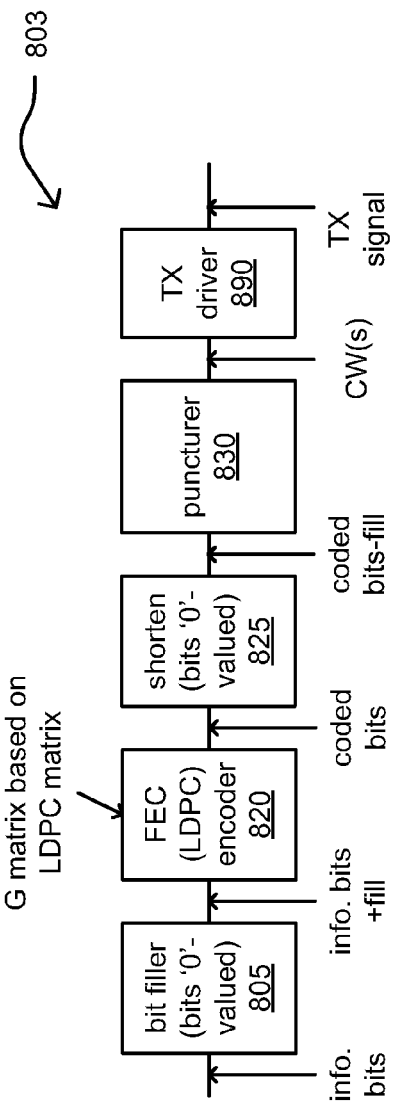
FIG. 8A
FIG. 8B
FIG. 8C

SIMPLIFIED MULTI-MODULATION CODING SET (MCS) OR MULTIPLE PROFILE TRANSMISSION (MPT) SCHEME FOR COMMUNICATIONS

CROSS REFERENCE TO RELATED PATENTS/PATENT APPLICATIONS

Provisional Priority Claims

The present U.S. Utility Patent Application claims priority pursuant to 35 U.S.C. § 119(e) to the following U.S. Provisional Patent Applications which are hereby incorporated herein by reference in their entirety and made part of the present U.S. Utility Patent Application for all purposes:

1. U.S. Provisional Patent Application Ser. No. 61/722,927, entitled "Simplified multi-modulation coding set (MCS) or multiple profile transmission (MPT) scheme for communications," filed Nov. 6, 2012.

2. U.S. Provisional Patent Application Ser. No. 61/723,258, entitled "Simplified multi-modulation coding set (MCS) or multiple profile transmission (MPT) scheme for communications," filed Nov. 6, 2012.

BACKGROUND

Technical Field

The present disclosure relates generally to communication systems; and, more particularly, to profile and/or modulation coding set (MCS) adaptive communications between communication devices within such communication systems.

Description of Related Art

Data communication systems have been under continual development for many years. The primary goal within such communication systems is to transmit information successfully between devices. In some instances, a first device may be implemented transmit information to a second device using a given scheme (e.g., a certain form of signaling, a certain modulation coding set (MCS), a certain forward error correction (FEC) or error correction code (ECC), etc.). A first device that employs such a scheme can increase the likelihood of a successful transmission of information to the second device.

There appears to be no limit in the desire to transmit information between devices at ever-increasing transmission rates and at ever-decreasing lower error rates. However, there can also be certain design considerations regarding trade-offs of acceptably high transmission rates and acceptably low error rates in terms of cost, complexity, and other considerations when implementing a device.

BRIEF DESCRIPTION OF THE SEVERAL VIEWS OF THE DRAWINGS

FIG. 3A is a diagram illustrating an example of a communication device operative within one or more communication systems.

FIG. 3B is a diagram illustrating another example of a communication device operative within one or more communication systems.

FIG. 8A is a diagram illustrating an example of a communication device configured to perform forward error correction (FEC) encoding.

FIG. 8B is a diagram illustrating an example of a communication device configured to perform FEC encoding and puncturing.

FIG. 8C is a diagram illustrating an example of a communication device configured to perform bit filling, FEC encoding, shortening, and puncturing.

DETAILED DESCRIPTION

Figure 1:
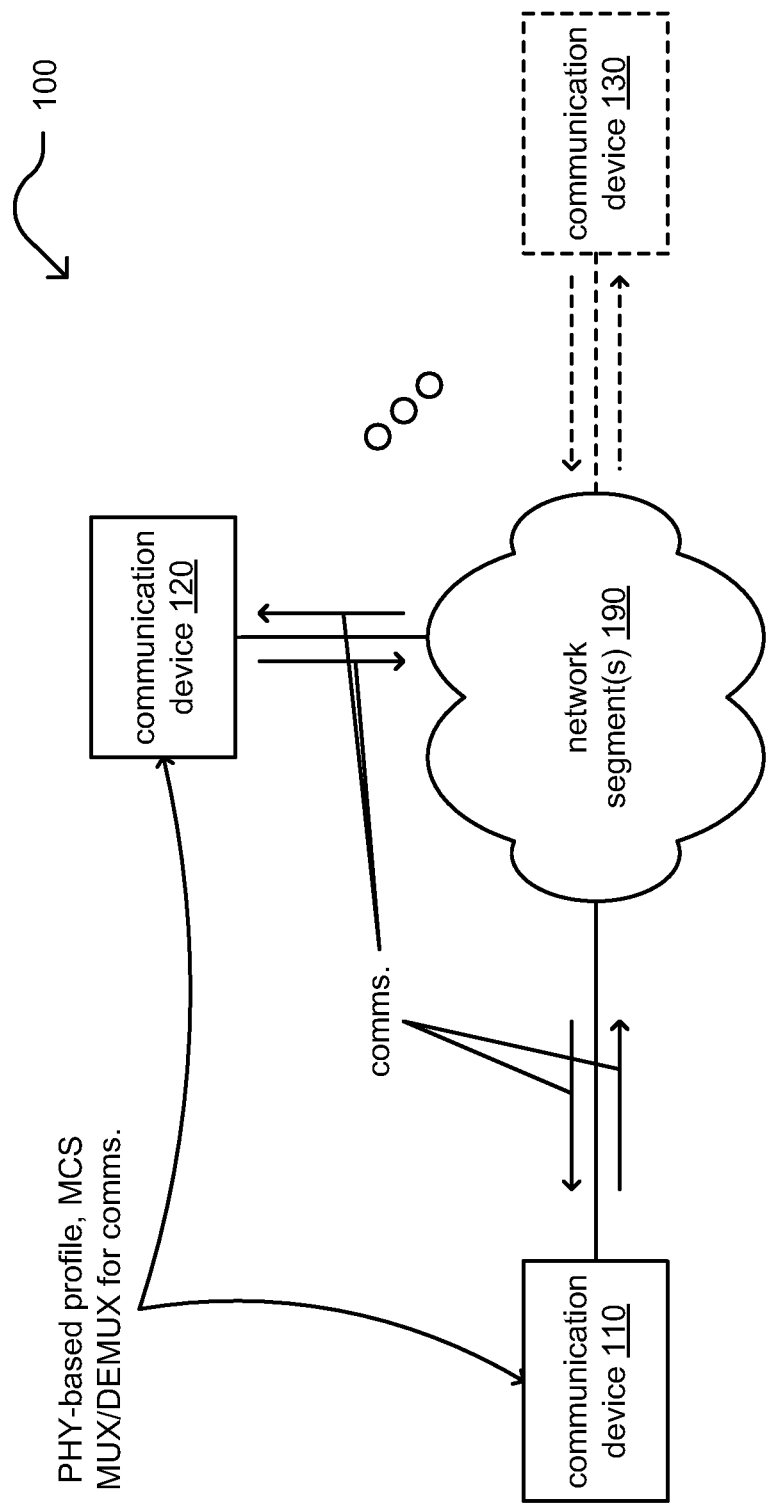
FIG. 1 is a diagram illustrating an embodiment of one or more communication systems.

FIG. 1 is a diagram illustrating an embodiment 100 of one or more communication systems. One or more network segments 190 provide communication inter-connectivity for at least two communication devices 110 and 120. Generally speaking, any desired number of communication devices are included within one or more communication systems (e.g., as shown by communication device 130). Some or all the various communication devices 110-130 include capability to support multi-profile communications as described herein.

The various communication links within the one or more network segments 190 may be implemented using any of a variety of communication media including communication links implemented as wireless, wired, optical, satellite, microwave, etc. communication links. Also, in some instances, communication links of different types may cooperatively form a connection pathway between any two communication devices. Considering one possible example, a communication pathway between devices 110 and 120 may include some segments of wired communication links and other segments of optical communication links. Note also that the devices 110-130 may be of a variety of types of devices including stationary devices, mobile devices, portable devices, etc. and may support communications for any of a number of services or service flows including data, telephony, television, Internet, media, synchronization, etc.

In an example of operation, device 110 includes a communication interface to support communications with one or more of the other devices 120-130. This communication may be bidirectional/to and from the one or more of the other devices 120-130 or unidirectional (or primarily unidirectional) from the one or more of the other devices 120-130.

In an example of operation, device 110 may be implemented to support multi-profile communications with device 120 and/or 130. Device 110 may be implemented to include a media access control (MAC) processor configured to generate packets for transmission to device 120 and/or 130, and device 110 may also be implemented to include a physical layer (PHY) processor configured to select one or more profiles to be used to transmit one or more packets to device 120 and/or 130. Device 110 is implemented to perform such profile selection and associated operations at the PHY layer. The profile may be selected based on one or more characteristics of a communication pathway between device 110 and device 120 and/or 130. Examples of such characteristics may include signal to noise ratio (SNR), signal to interference noise ratio (SINR), noise, interference, maximum and/or minimum supported bit or symbol rate, prior, current, and/or future expected operational history of the communication pathway, the type of communication media of the pathway (e.g., wired, wireless, optical, and/or combination thereof), etc. and/or other characteristics.

A profile may include one or more operational parameters for use in transmitting one or more packets between devices. Examples of such operational parameters may include modulation coding set (MCS) (e.g., quadrature amplitude modulation (QAM), 8 phase shift keying (PSK), 16 quadrature amplitude modulation (QAM), 32 amplitude and phase shift keying (APSK), and/or different types of MCS, etc.), forward error correction (FEC) and/or error correction code (ECC) (e.g., turbo code, convolutional code, turbo trellis coded modulation (TTCM), low density parity check (LDPC) code, Reed-Solomon (RS) code, BCH (Bose and Ray-Chaudhuri, and Hocquenghem) code, etc.), a number of bits per symbol per sub-carrier and/or sub-carrier mapping (e.g., such as based on orthogonal frequency division multiplexing (OFDM) or orthogonal frequency division multiple access (OFDMA), including groups of sub-carriers (SGs) for various purposes such as media access protocol (MAP) messages and data to various recipient communication devices), cyclic prefix, channel(s) used in transmission, bit-filling and shortening, unicast and/or multicast transmission, Quality of Service (QoS), physical layer (PHY) efficiency, and/or other operational parameters. Note that each respective profile may have individual and unique values and types for any of these exemplary operational parameters described above. In some instances, two profiles may have one or more common values and types for certain operational parameters yet have different values and types for at least one operational parameter.

Also, device 110 may be implemented to operate using at least two different modes. In one mode, a PHY processor of device 110 aggregates two or more packets to be transmitted to a recipient device (e.g., device 120); in this mode, there may be one or more other packets received between the two or more packets that are aggregated. In another mode, a PHY processor of device 110 processes a packet received from the MAC processor and transmits it to the recipient device (e.g., device 120).

Figure 2:
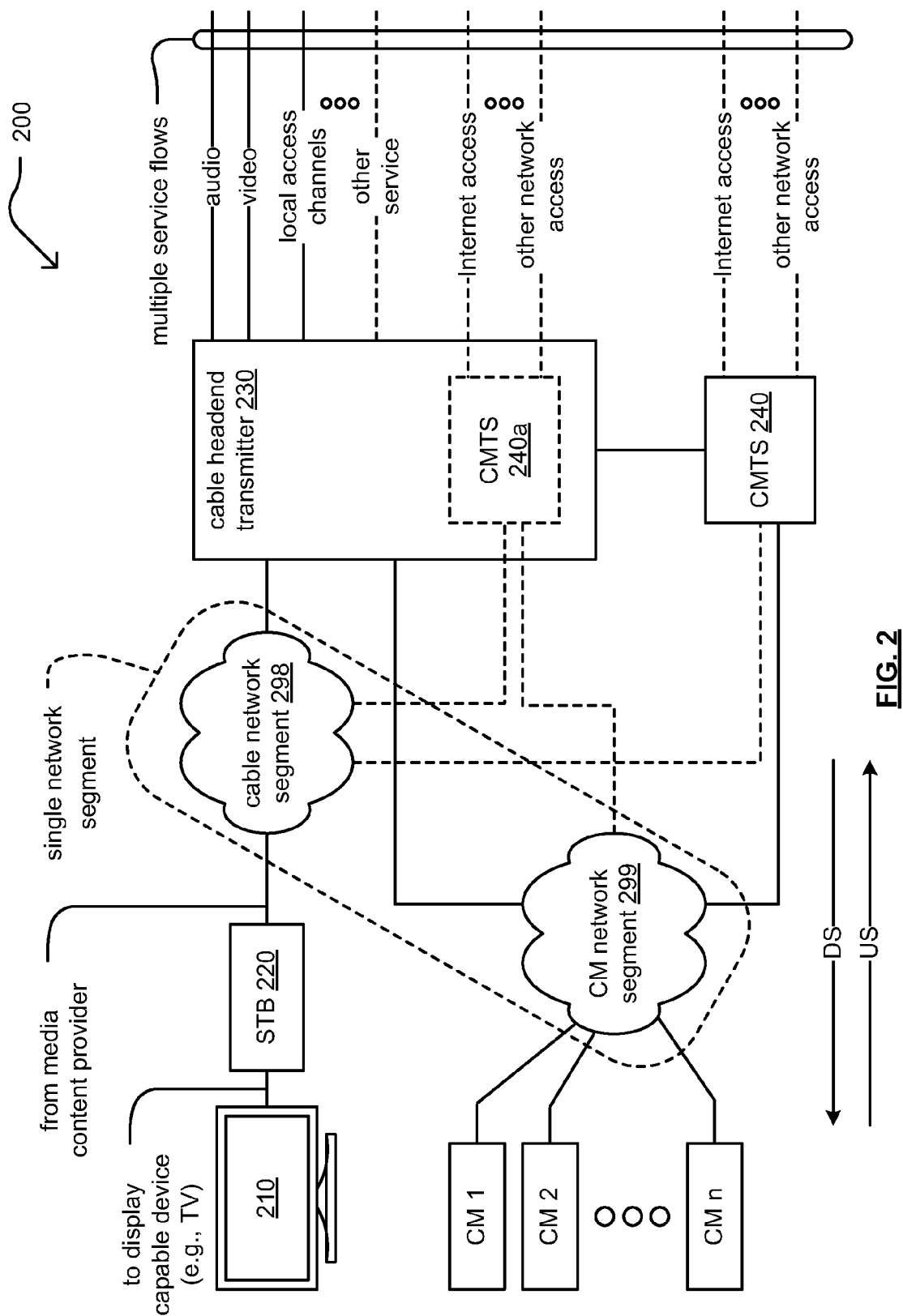
FIG. 2 is a diagram illustrating another embodiment of one or more communication systems.

FIG. 2 is a diagram illustrating another embodiment 200 of one or more communication systems. A cable headend transmitter 230 provides service to a set-top box (STB) 220 via cable network segment 298. The STB 220 provides output to a display capable device 210. The cable headend transmitter 230 can support any of a number of service flows such as audio, video, local access channels, as well as any other service of cable systems. For example, the cable headend transmitter 230 can provide media (e.g., video and/or audio) to the display capable device.

The cable headend transmitter 230 may provide operation of a cable modem termination system (CMTS) 240a. For example, the cable headend transmitter 230 may perform such CMTS functionality, or a CMTS may be implemented separately from the cable headend transmitter 230 (e.g., as shown by reference numeral 240). The CMTS 240 can provide network service (e.g., Internet, other network access, etc.) to any number of cable modems (shown as CM 1, CM 2, and up to CM n) via a cable modem (CM) network segment 299. The cable network segment 298 and the CM network segment 299 may be part of a common network or common networks. The cable modem network segment 299 couples the cable modems 1-n to the CMTS (shown as 240 or 240a). Such a cable system (e.g., cable network segment 298 and/or CM network segment 299) may generally be referred to as a cable plant and may be implemented, at least in part, as a hybrid fiber-coaxial (HFC) network (e.g., including various wired and/or optical fiber communication segments, light sources, light or photo detection complements, etc.).

A CMTS 240 (or 240a) is a component that exchanges digital signals with cable modems 1-n on the cable modem network segment 299. Each of the cable modems is coupled to the cable modem network segment 299, and a number of elements may be included within the cable modem network segment 299. For example, routers, splitters, couplers, relays, and amplifiers may be contained within the cable modem network segment 299. Generally speaking, downstream information may be viewed as that which flows from the CMTS 240 to the connected cable modems (e.g., CM 1, CM2, etc.), and upstream information as that which flows from the cable modems to the CMTS 240.

In an example of operation, any one of the communication devices in the diagram may include a MAC processor and a PHY processor. The MAC processor may be configured to generate one or more packets for transmission to other of the communication devices and the diagram, and the PHY processor may be configured to select a profile for use in transmitting the one or more packets to a recipient device. In an example of operation, one of the cable modems (e.g., CM 1) includes a MAC processor configured to generate one or more packets for transmission to CMTS 240 (or 240a). The cable modem also includes a PHY processor configured to select a profile to transmit the one or more packets to CMTS 240 (or 240a). The profile may be selected based on one or more characteristics of a communication pathway between the cable modem and CMTS 240 (or 240a). In one mode of operation, the cable modem aggregates two or more of the packets to generate an aggregated packet for transmission to CMTS 240 (or 240a). In another mode of operation, the cable modem at one or more zero-valued fill bits to a packet, encodes the packet that includes the fill bits to generate an forward error correction (FEC) codeword, and transmits the FEC codeword to CMTS 240 (or 240a).

Note that a communication device as described herein may be implemented to support multi-profile communications adaptively based on one or more considerations. For example, a device may operate using a first mode at one time (e.g., packet aggregation), and the device may operate using a second mode at a second time (e.g., bit-filling and shortening). Also, a device may operate using a first profile at one time, and the device may operate using a second profile the second time. The device may adapt and switch between operational modes, profiles, etc. based on one or more considerations that may include local considerations, communication pathway considerations, remote considerations, etc. For example, a device may select an operational mode and profile for communications to a recipient device based on prior, current, or future expected operational history of one or more of the device, the recipient device, the communication pathway between the devices, etc. As one or more operational conditions change, the device may select another operational mode and/or profile for communication to a recipient device. The device may perform such adaptation in response to a change of an operational condition (e.g., when such a change is detected or occurs). Alternatively, the device may perform such adaptation at certain times when status of one or more operational conditions is checked, and also when a change of such an operational condition is detected.

FIG. 3A is a diagram illustrating an example 301 of a communication device 110 operative within one or more communication systems. The device 110 includes a physical layer (PHY) processor (e.g., a communication interface) 320 and a media access control (MAC) processor 330. The PHY processor 320 includes functionality of a transmitter 322 and the receiver 324 to support communications with one or more other devices within a communication system. The device 110 may also include memory 340 to store information including communication profiles to be employed by the device 110 or such information received from other devices via one or more communication channels. Memory 340 may also include and store various operational instructions for use by the processor 330 in regards to profile selection, operational mode selection, etc. as described herein. Memory 340 may also include and store information related to instructions and operations such as may be used in performing profile and/or operational mode selection as described herein.

The PHY processor 320 is configured to support communications to and from one or more other devices. The relative operations of the PHY processor 320 in the MAC processor 330, and or other higher layers 350, may be understood with reference to the different abstraction layers into which a communication system may be partitioned. One example of such partitioning is based on the Open Systems Interconnection (OSI) model (ISO/IEC 7498-1) conceptual model that includes seven logical layers including, the physical layer (e.g., the PHY layer), the data link layer (e.g., that includes the media access control (MAC) layer), and one or more higher layers such as the network layer, the transport layer, the session layer, the presentation layer, and the application layer. Generally, the different abstraction layers may be partitioned into the PHY layer and the MAC and reconciliation layers (e.g., that include any higher layers above the PHY layer).

The PHY processor 320 of device 110 is configured to receive one or more packets from the MAC processor 330 (e.g., such as those generated by the MAC processor 330 or provided from one or more of the higher layers 350). The PHY processor 320 selects a profile based on one or more characteristics of a communication pathway between device 110 and device 120. The PHY processor 320 may select a first profile for transmission of a first packet to device 120 and a second profile for transmission of a second packet to device 120. In addition, the PHY processor 320 may operate using different operational modes. The PHY processor 320 may operate using a first mode of packet aggregation at one time and a second mode of bit-filling and shortening and another time.

FIG. 3B is a diagram illustrating another example 302 of a communication device 110 operative within one or more communication systems. This example 302 shows further details of the PHY processor 320. The PHY processor 320 may be subdivided into an analog front end (AFE) 380, a converter section 370, and a digital front end (DFE) 380. The PHY processor 320 may be further described to include transmit and receive paths within each of the AFE 380, converter section 370, and the DFE 380. For example, a transmit path may be viewed as including a transmitter portion 361 of the DFE 360, a digital to analog converter (DAC) 371 of the converter section 370, and a transmitter portion 381 of the AFE 380. A receive path many viewed as including receiver portion 382 of the AFE 380, an analog to digital converter (ADC) 372 of the converter section 370, and a receiver portion 362 of the DFE 360. Generally speaking, the AFE 380 may be viewed as performing operations such as signal scaling and filtering, frequency conversion from a transmission frequency or radio frequency (RF) to a frequency of the converter section 370 (e.g., such as baseband frequency or an intermediate frequency), and other analog-based operations. The converter section 370 may be viewed as performing conversion between the digital and analog domains. The DFE 360 may be viewed as performing operations typically associated with a baseband processor such as filtering, scaling, frequency conversion, data buffering, etc. In one implementation, the DFE 360 performs profile and/or operational mode selection by which packets received from the MAC processor 330 are transmitted to device 120.

Note that in either example 301 or 302 of device 110, a singular processor may be configured to perform operations of both the MAC processor 330 and the PHY processor 320. However, note that device 110 may be configured to perform such profile and/or mode selection at the PHY layer even in such instances in which a singular processor performs operations of both the MAC processor 330 and the PHY processor 320.

Figure 4:
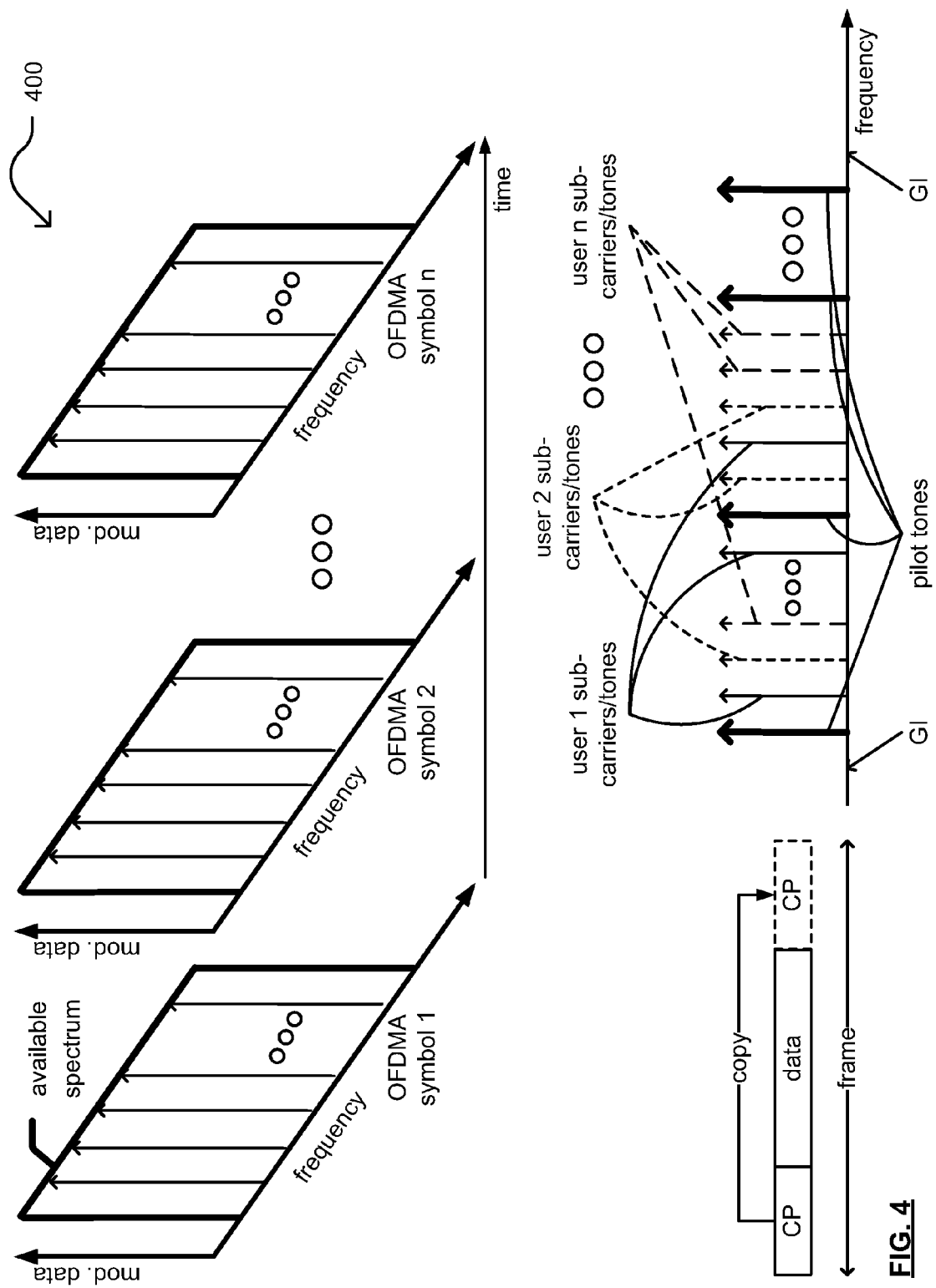
FIG. 4 is a diagram illustrating an example of orthogonal frequency division multiple access (OFDMA).

FIG. 4 is a diagram illustrating an example 400 of orthogonal frequency division multiple access (OFDMA). Generally, OFDMA is a modification of orthogonal frequency division multiplexing (OFDM) such that different sub-carriers are assigned to different respective users and/or for different uses (e.g., different groups of sub-carriers use for different purposes). Orthogonal frequency division multiplexing (OFDM) modulation may be viewed a dividing up an available spectrum into a plurality of narrowband sub-carriers (e.g., lower data rate carriers). Typically, the frequency responses of these sub-carriers are overlapping and orthogonal. Each sub-carrier may be modulated using any of a variety of modulation coding techniques (e.g., as shown by the vertical axis of modulated data). Comparing OFDMA to OFDM, OFDMA is a multi-user version of the popular orthogonal frequency division multiplexing (OFDM) digital modulation scheme. Multiple access may be achieved in OFDMA by assigning subsets of sub-carriers to individual recipient devices for users. For example, first sub-carrier(s)/tone(s) may be assigned to a user 1, second sub-carrier(s)/tone(s) may be assigned to a user 2, and so on up to any desired number of users. In addition, such sub-carrier/tone assignment may be dynamic among different respective transmissions (e.g., a first assignment for a first frame, a second assignment for second frame, etc.). An OFDMA frame may include more than one OFDMA symbol. In addition, such sub-carrier/tone assignment may be dynamic among different respective symbols within a given (e.g., a first assignment for a first OFDMA symbol within a frame, a second assignment for a second OFDMA symbol within the frame, etc.).

OFDM and/or OFDMA modulation may operate by performing simultaneous transmission of a large number of narrowband carriers (or multi-tones). A guard interval (GI) or guard space is sometimes employed between the various OFDM symbols to try to minimize the effects of ISI (Inter-Symbol Interference) that may be caused by the effects of multi-path within the communication system, which can be particularly of concern in wireless communication systems. In addition, a CP (Cyclic Prefix) may also be employed within the guard interval to allow switching time, such as when jumping to a new communication channel or sub-channel, and to help maintain orthogonality of the OFDM and/or OFDMA symbols. Generally speaking, an OFDM and/or OFDMA system design is based on the expected delay spread within the communication system (e.g., the expected delay spread of the communication channel).

With respect to sub-carrier mapping for transmissions between devices, note that one or more sub-carriers may be assigned for specific purposes. As an example, a media access protocol (MAP) message may be communicated from one device to one or more other devices to indicate profile assignment for those devices. A recipient device can process the MAP message to determine which operational characteristics will be used for communications to it (e.g., which MCS is employed, which sub-carriers to listen on, what type of FEC or ECC is employed, etc.). In one implementation, one or more sub-carriers are always dedicated for transmission of such MAP messages, yet the other sub-carriers may be dynamically assigned for different purposes and for different recipients over time.

Figures 5A, 5B:
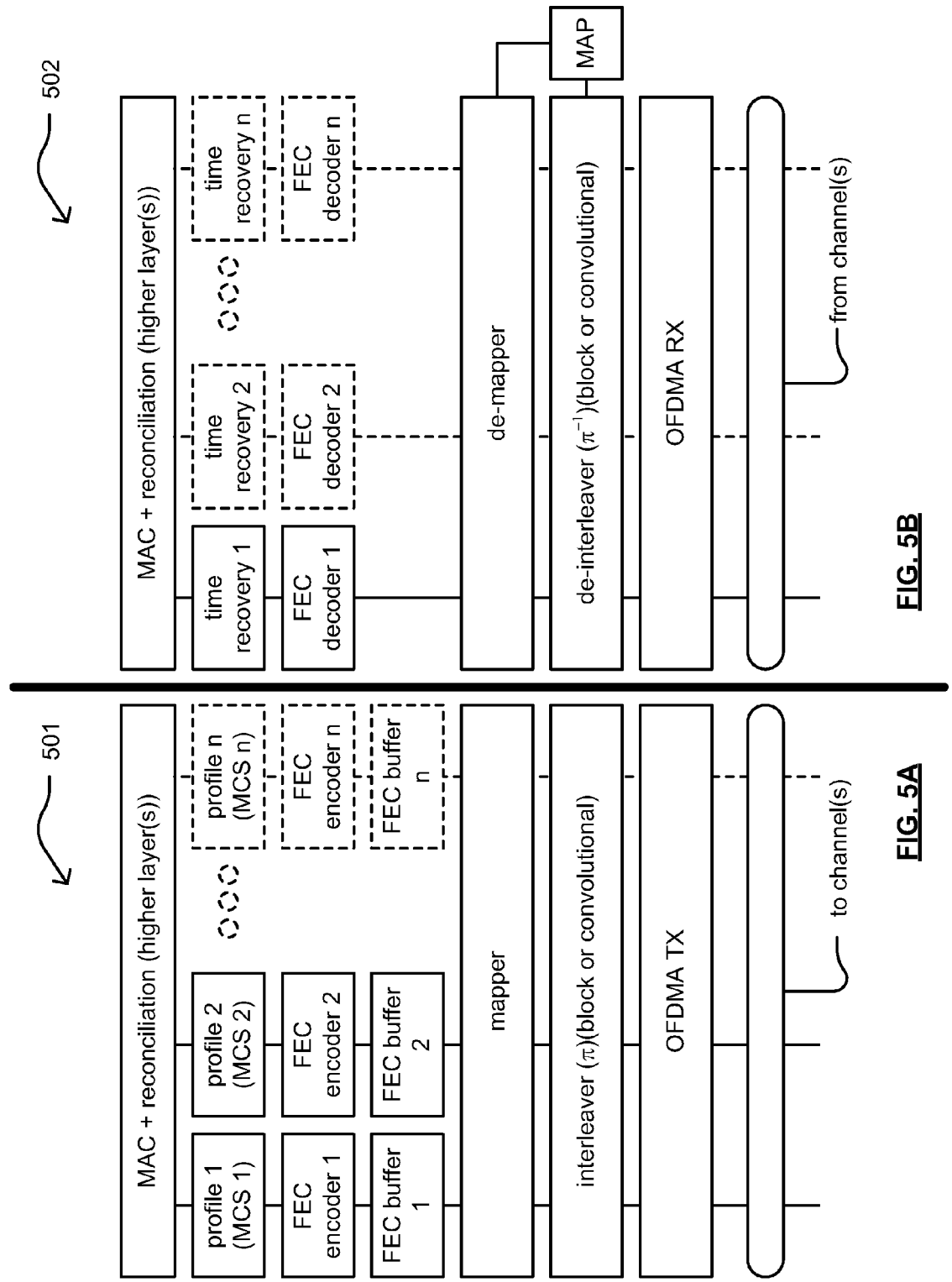
FIG. 5A is a diagram illustrating an example of a downstream (DS) OFDMA transmitter.
FIG. 5B is a diagram illustrating an example of a DS OFDMA receiver.

FIG. 5A is a diagram illustrating an example 501 of a downstream (DS) OFDMA transmitter. Packets are provided from a MAC layer and/or one or more higher layers, such as a reconciliation layer. A device may be implemented to support communications using any one of n different profiles (e.g., shown as profile one, profile 2, up to profile n. Each respective profile may have an associated modulation coding set (MCS) (e.g., show as MCS 1, MCS 2, up to MCS n). Note also that each respective profile may have any number of other operational parameters including forward error correction (FEC) and/or error correction code (ECC) (e.g., such as coding based on turbo, convolutional, turbo trellis coded modulation (TTCM), low density parity check (LDPC), Reed-Solomon (RS), BCH (Bose and Ray-Chaudhuri, and Hocquenghem), etc. and/or any combination of different types of coding etc.), a number of bits per symbol per sub-carrier and/or sub-carrier mapping (e.g., such as based on orthogonal frequency division multiplexing (OFDM) or orthogonal frequency division multiple access (OFDMA)), cyclic prefix, channel(s) used in transmission, bit-filling and shortening, unicast and/or multicast transmission, and/or other operational parameters.

A communication device may also select a given profile to use for communications based on a number of other considerations (e.g., SNR, SINR, noise, interference, maximum and/or minimum supported bit or symbol rate, prior, current, and/or future expected operational history of the communication pathway, the type of communication media of the pathway (e.g., wired, wireless, optical, and/or combination thereof), etc. and/or other characteristics). One approach is signal to noise ratio (SNR) based in an effort to minimize impact of to a recipient communication device. This can select an appropriate profile based on the SNR of the communication pathway. Considering an example of implementation, each profile may have a different number of bits per sub-carrier (e.g., one profile may have 1 or 2 bits per symbol less than another). The profiles may have variation in terms of frequency variation (e.g., bit loading per sub-carrier). When comparing two profiles, there may be a difference in number of bits per symbol per sub-carrier on one or more of the sub-carriers, and there may also be a difference in total number of bits in one OFDMA symbol associated with one profile to another OFDMA symbol associated with another profile (e.g., considering across all sub-carriers of the OFDMA symbols). Generally, a communication device may be implemented to include any desired number of profiles tailored to meet any number of different criteria.

These various profiles may be viewed as different channels (profile channels) that are supported by a device that communicates with one or more other devices. In one implementation, one or more of the channels operates based on multicast or broadcast (e.g., transmissions sent to two or more recipient devices), while one or more other of the channels operates based on unicast (e.g., transmissions tailored and sent to a particular recipient device). A recipient device (e.g., a cable modem) may be implemented to listen to a unicast channel specified for that recipient device as well as the one or more multicast or broadcast channels. A unicast transmission can include information targeted for and specific to a given recipient device, while a multicast or broadcast transmission can include information targeted for a number of recipient devices (e.g., two or more). A recipient device will listen for any unicast transmission intended for it as well as multicast or broadcast transmissions.

Each profile also performs forward error correction (FEC) encoding and buffering to generate coded information based on the packets provided from the MAC layer and/or one or more higher layers. In some instances, the same FEC is employed by all profiles. In other instances, different respective FECs may be employed by each of the different profiles, and two or more profiles may use the same FEC.

A mapper generates the MAP messages that operate to map the profiles to the various groups of sub-carriers (SGs) by which information is to be transmitted to one or more recipient devices. The MAP messages are carried in-band in one or more dedicated channels (e.g., one or more SGs based on a fixed group of sub-carriers). An MAP message may be implemented to correspond to a current OFDMA frame or a subsequent or next OFDMA frame. When implemented based on the current OFDMA frame, relatively lower overhead may be needed and relatively more flexibility in sub-carrier assignment and allocation may be made relative to implementation based on a subsequent or next OFDMA frame, which may nonetheless be simpler to implement.

If desired, an interleaver ($\pi$) may be implemented to interleave the output from the mapper. Such interleaving may be blocked-based or convolutional-based in different implementations. Then, an OFDMA transmitter operates to transmit a continuous-time signal to one or more recipient devices via one or more communication channels.

A device may be implemented to operate based on two or more operational modes. The one operational mode, the device may aggregate packets received from the MAC layer and/or one or more higher layers into an aggregated packet of a desired size, such as that of an FEC codeword size. When an adequate number of packets are received to fill an FEC codeword, then one or more appropriate SGs are allocated for transmission of the aggregated packet. Note also that a device may be implemented to wait only a certain period of time before making a transmission when operating in this operational mode. As an example, if a certain number of packets are not received after a certain amount of time, then the device may transmit those received packets even though the number of received packets may not correspond to an FEC codeword size. Such a period of time (e.g., time-out) may be predetermined, fixed, or adaptively determined based on any number of considerations. In some instances, codewords are sent based on a selected profile in the one or more SGs allocated to that profile. The codewords may be transmitted in the order by which they are received from the MAC layer and/or one or more higher layers. In other instances, codewords may be sent in a slightly different order than by which they are received from the MAC layer and/or one or more higher layers.

In another operational mode, successive packets of the same profile are received by the FEC buffer of that profile. The mapper then allocates one or more of the SGs for use in transmitting those packets based on the selected profile. In this operational mode, codewords are sent based on a selected profile in the one or more SGs allocated to that profile, and the codewords are transmitted in the order by which they are received from the MAC layer and/or one or more higher layers.

FIG. 5B is a diagram illustrating an example 502 of a DS OFDMA receiver. Generally, such a DS OFDMA receiver performs reception and processing of a signal transmitted from a DS OFDMA transmitter of FIG. 5A. For example, an OFDMA receiver receives a continuous-time signal via a communication channel from a transmitting device. A recipient device is configured to buffer all received symbols (e.g., quadrature amplitude modulation (QAM) or other modulation symbols) in a received OFDMA frame. A de-interleaver ($\pi^{-1}$) (e.g., block or convolutional) then identifies a MAP message to determine which SGs are to be processed by a de-mapper. The device extracts the MAP symbols from its dedicated sub-carriers and/or SGs. The device then extracts all other received symbols according to the information within the MAP message. The recovered packets are then forwarded from the PHY layer to the MAC layer. Time recovery is performed when operating within the first operational mode described above corresponding to aggregation of packets.

Note that a given recipient device such as shown in this diagram may include as few as one FEC and time recovery processing chain. For example, a recipient device may include a singular FEC in time recovery processing chain specific for that recipient device. Alternatively, a device may include one or more additional FEC in time recovery processing chains to allow for reception and processing of signals based on other profiles. A device including different processing chains may switch between the respective chains depending on various considerations including information received via one or more MAP messages.

Figure 6:
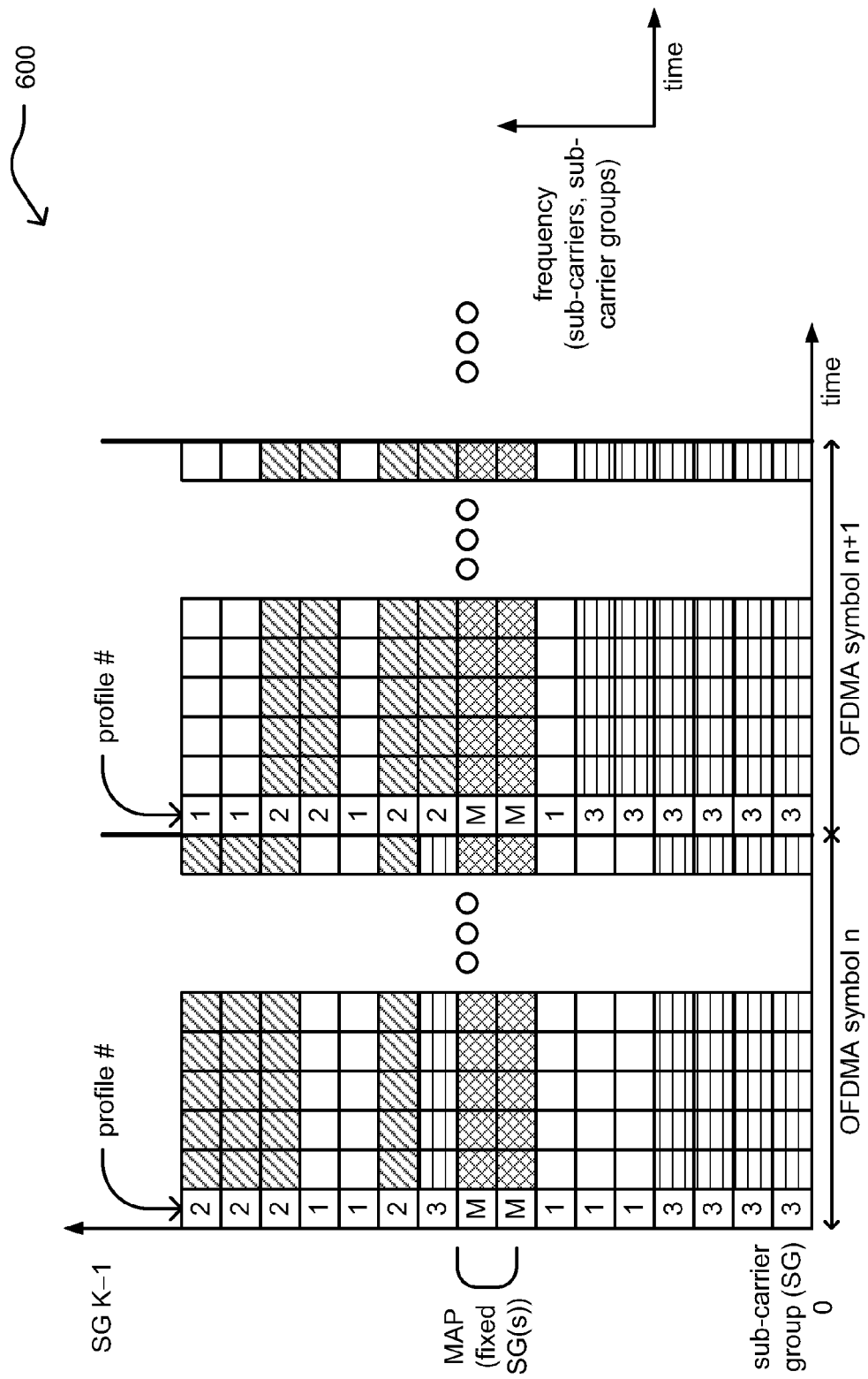
FIG. 6 is a diagram illustrating an example of a DS OFDMA frame.

FIG. 6 is a diagram illustrating an example 600 of a DS OFDMA frame. A DS OFDMA frame may include multiple respective OFDMA symbols (e.g., shown as OFDMA symbol n, OFDMA symbol n+1, and so on). In this diagram, the horizontal axis corresponds to time, and the vertical axis corresponds to frequency including various sub-carriers employed in the OFDMA signaling and the partitioning of the sub-carriers into the various SGs. Note that one or more SGs are fixed and dedicated for transmission of MAP messages within each respective OFDMA symbol. The other SGs may be modified and adapted for use by different profiles within different OFDMA symbols. For example, in the OFDMA symbol n, profile 1 is used by 5 different SGs, profile 2 is used by 4 different SGs, and profile 3 is used by 5 other SGs. Then, in the OFDMA symbol n+1, profile 1 is used by 4 different SGs, profile 2 is used by 4 other SGs, and profile 3 is used by 6 contiguous SGs. Note that a given profile may operate using one or more SGs that may be contiguous or non-contiguous. The selection of which SGs are used by which profile(s) for various OFDMA symbols may be made based on any of a number of various considerations including prior, current, or future expected operational history of one or more of the device, the recipient device, the communication pathway between the devices, etc.

Some examples of MAP to current OFDMA frame mapping are provided below. These examples employ an orthogonal frequency division multiplexing (OFDM) symbol size is 20 μsec, up-to 3840 available sub-carriers (including 32 for PHY Link Channel), four (4) MCS Channels with constellation size QAM 256 to QAM 4096 and an FEC baseline code of a 12K [all bits] 90% (e.g., 0.9 code rate) LDPC code as a baseline code, and a block interleaver with size of 250 μsec (12 OFDM symbols).

Figure 7:
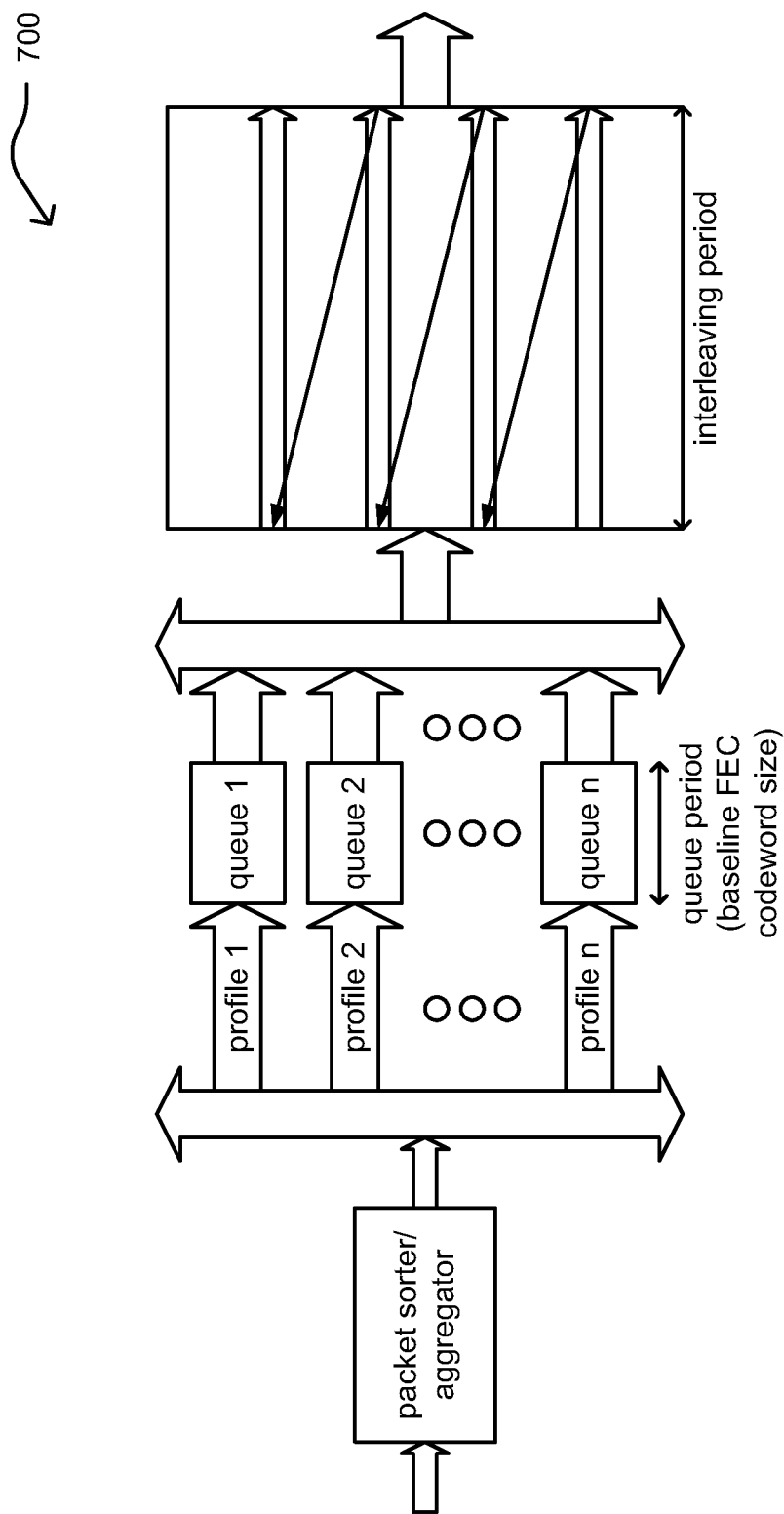
FIG. 7 is a diagram illustrating an example of a communication device operative to support multi-profile communications.

Option 1
  Sub-carrier per subgroup: 8
    MAP overhead
      Number of sub-carrier groups: 480
      MAP message is 480×2 bits (four different MCS Channels)
      20 sub-carriers (~0.5% MAP overhead) with 4 Bits/Hz for MAPs
  FEC padding overhead (a single FEC)
    Averaged overhead three times 1200 parity bits with 3840 QAM256 symbols <0.5%
  OFDM overhead
    Averaged overhead 144×8 bits with 3840 QAM 256 symbols <0.5%
  Overall additional overhead is 1.5%
  Interleaver latency 500 μsec
Option 2
  Sub-carrier per a subgroup: 32
    MAP overhead
      Number of sub-carrier groups: 120
      MAP message is 120×2 bits
      60 sub-carriers (~1.5% MAP overhead)
  FEC padding overhead (FEC) of 5%
  OFDM overhead
    Averaged overhead 384 bits over 3840 QAM256 symbols <1.5%
  Overall additional overhead 8%
  No Interleaver latency FIG. 7 is a diagram illustrating an example of a communication device operative to support multi-profile communications. A device may be implemented to include a packet sorter/aggregator to operate in the aggregation operational mode. The packet sorter/aggregator sorts and aggregates ingress packets (e.g., from the MAC layer) per profile into codeword sized queues. Once a queue is full, it is written to an interleaver (e.g., block or convolutional) across symbols.

A device may also be amended to perform bit-filling and shortening in another operational mode. In this operational mode, codewords that are partially-filled are shortened once an interleaving period of time. Note that shortened codewords create an overhead that does not exist in broadcast transmission. This overhead may be calculated with different options of shortening.

FIG. 8A is a diagram illustrating an example 802 of a communication device configured to perform forward error correction (FEC) encoding. A forward error correction (FEC) encoder 820 processes information bit to generate coded bits (e.g., which may be expressed as codewords). A transmit (TX) driver 890 processes the coded bits or one or more codewords to generate one or more continuous-time signals for transmission to one or more other devices via one or more communication channels. The TX driver 890 may perform operations such as those of an analog front end (AFE) of a communication device (e.g., digital to analog conversion, frequency conversion such as conversion, scaling, filtering, etc.). Generally, the TX driver 890 operates to generate a signal suitable for transmission from the communication device.

FIG. 8B is a diagram illustrating an example 802 of a communication device configured to perform FEC encoding and puncturing. A forward error correction (FEC) encoder 820 processes information bit to generate coded bits. A puncturer 830 punctures one or more subsets of information bits and one or more subsets of parity bits from the coded bits generated by the FEC encoder 820 to generate one or more codewords. These subsets of information bits and parity bits may be groups of contiguous bits within the coded bits. For example, a first contiguous subset of information bits (e.g., having a first period) may be punctured, and a contiguous subset of parity bits may be punctured (e.g., having the first or a second period). In other examples, more than one contiguous subset may be punctured from the coded bits (e.g., two or more contiguous subsets of information bits may be punctured, and two or more contiguous subsets of parity bits may be punctured). In even other examples, different numbers of subsets of bits may be punctured from the information bits and the parity bits (e.g., one subset of bits punctured from information bits, and to subsets of bits punctured from the parity bits). Such puncturing may be performed using different periods of bits, different starting locations within the coded bits, A transmit (TX) driver 890 processes the one or more codewords to generate one or more continuous-time signals for transmission to one or more other devices via one or more communication channels. The TX driver 890 may perform operations such as those of an analog front end (AFE) of a communication device (e.g., digital to analog conversion, frequency conversion such as conversion, scaling, filtering, etc.). Generally, the TX driver 890 operates to generate a signal suitable for transmission from the communication device.

FIG. 8C is a diagram illustrating an example 803 of a communication device configured to perform bit filling, FEC encoding, shortening, and puncturing. The example 803 has some similarity to the example 802 of FIG. 8B with differences being that a bit filler 805 operates to add one or more zero-valued bits to the incoming information bits before encoding by the FEC encoder 820. After FEC encoding, a shortener 825 operates to remove those zero-valued bits that were added to the information bit before undergoing FEC encoding. The other components (820, 830, and 890) in the example 803 generally operate similarly as within example 801 of FIG. 8A and 802 of FIG. 8B.

In some applications, low density parity check (LDPC) codes may be used as the FEC coded for encoding in the examples 801-803. Generally, LDPC codes typically have sizes of beyond 100 bit block lengths. The example 803 may be used to perform puncturing or bit filling, shortening, and puncturing in combination with LDPC coding to generate relatively short length codes (e.g., much shorter than 100, and a shortest of 24 bits in at least one instance).

To describe a shortening pattern, three indices are used, as follows:
(1) Shortening period
(2) Shortening sizes
(3) Shortening start position for a period Consider the constructed short LDPC code is an (N, K) code, then there are N positions, namely 0, 1, . . . , N−1. Consider that k information bits will be encoded. A shortening pattern with P periods may denote a shortening size for every period by $s_0, s_1, \ldots, s_{P-1}$, respectively, and the shortening start positions for every period by $n_0, n_1, \ldots, n_{P-1}$. This may be described as follows:

$$\sum_{i=0}^{P-1} s_i = K - k \text{ and } 0 \le n_0 < n_1 < \ldots < n_{P-1} < K - 1.$$

An LDPC encoder can be implemented as follows:

Given k information data bits, after the first $n_0$ information bits pad $s_0$ the receiver known bits, say 0s; then fill more information bits before the position $n_1$; then pad $s_1$ 0's starting at position $n_2$, . . . etc.

LDPC encoding will then generate a codeword as follows:
$(c_0, c_1, \ldots, c_{K-1}, c_K, \ldots, c_{N-1})$.

Among the k information bits there are K−k padded or filled 0-valued bits (e.g., bits having value of '0'/zero). The last N−K codeword bits are parity bits, namely, $c_0 c_K, \ldots, c_{N-1}$.

Similar to shortening pattern, puncturing pattern also use 3 sets of indices as follows:
(1) Puncturing period, say Q
(2) Puncturing sizes, say $t_0, t_1 \ldots, t_{Q-1}$
(3) Puncturing start position, say $m_0, m_1 \ldots, m_{Q-1}$ The output bits of the shortening and puncturing encoder can be given as follows:

Step 1: from the codeword $(c_0, c_1 \ldots, c_{K-1}, c_K, \ldots, c_{N-1})$, starting from position $m_i$ delete $t_i$ bits, respectively for i=0, . . . , Q−1.

Step 2: delete all filled or padded bits from LDPC encoder

Some specific examples are provided below that perform shortening and puncturing on a relatively longer size code to generate a relatively short length code.

A punctured LDPC code 50% (48,24) may be generated using the architecture of FIG. 8C based on the short, mother LDPC code (160,80). The punctured LDPC code 50% (48,24) may be used for the NCP channel. For example, a shortening size of 56 may be applied to 24 information bits. With reference to FIG. 8C, 56 consecutive 0-valued bits (e.g., 00 . . . 0) may be filled, starting at position 24, with respect to the information bits (e.g., $a_{23} \ldots a_0$) to generate a sequence of 80 total bits (e.g., 00 . . . 0). The FEC/LDPC encoder 620 then uses the short LDPC code (160,80) to encode the information plus fill bits to generate 160 coded bits (e.g., $b_{159} \ldots b_{80} 00 \ldots 0 a_{23} \ldots a_0$). Then, the shorter 625 removes the 56 0-valued fill bits (e.g., 00 . . . 0) from the 160 coded bits (e.g., $b_{159} \ldots b_{80} 00 \ldots 0 a_{23} \ldots a_0$). so that only the 24 information bits and the parity bits remain (e.g., $b_{159} \ldots b_{80} a_{23} \ldots a_0$).

The puncturer 830 may then perform puncturing of this sequence (e.g., $b_{159} \ldots b_{80} a_{23} \ldots a_0$) using a period of 3 as follows:
1. $1^{st}$ period: size 24 and starting position 80.
2. $2^{nd}$ period: size 16 and starting position 112.
3. $3^{rd}$ period: size 16 and starting position 144.

This puncturing may be shown as $$\underbrace{xx \ldots x}_{16 \text{ (3rd period)}} b_{143}b_{142} \ldots b_{128} \underbrace{xx \ldots x}_{16 \text{ (2nd period)}} b_{111}b_{110} \ldots b_{104} \underbrace{xxx \ldots x}_{24 \text{ (1st period)}} a_{23}a_{22} \ldots a_2 a_1 a_0.$$

and generates the following sequence or codeword $$\underbrace{b_{143}b_{142} \ldots b_{128}b_{111}b_{110} \ldots b_{104}}_{24} \underbrace{a_{23}a_{22} \ldots a_2 a_1 a_0}_{24}$$

that may be processed by the TX driver 890 to generate a transmit signal.

Any desired modulation may be employed for the NCP channel including 16 QAM based on 4 bit symbols, 64 QAM based on 6 bit symbols, etc. Orthogonal frequency division multiplexing (OFDM) signaling may be employed such as using 8 bit or 16 bit subcarrier or tone mapping, and NCP related information may be located at the beginning or end of data in a given OFDM symbol.

In another example, an LDPC matrix may be based on a mother LDPC code rate 60% or 6/10 (480,288), with sub-matrices of size 48×48. Also, the right hand side matrix, $H_{RHS}$, of this LDPC mother code has a form similar to those shown in FIG. 5A.

A punctured LDPC code ¾ or 75% (384,288) code may be generated using the architecture of FIG. 6A based on the mother LDPC code rate 60% or 6/10 (480,288). The punctured LDPC code ¾ or 75% (384,288) code may be used for the PLC channel. The mother LDPC code: 60% (480,288) code is a 4×10 base parity check matrix with sub-matrix size (lifting value) equal to 48 (sub-matrices of size 48×48).

The punctured LDPC code ¾ or 75% (384,288) code is obtained by puncturing (480,288) mother code using two puncturing periods (e.g., Period 1: size 48 start at 48 (puncturing information bits) and Period 2: size 48 start at 384 (puncturing parity bits)).

With reference to FIG. 8B, the FEC/LDPC encoder 820 encodes 288 information bits (e.g., $a_{287} \ldots a_1 a_0$) to generate a coded sequence (e.g., $b_{479} \ldots b_{288}a_{287} \ldots a_1 a_0$).

The puncture 630 operates on the coded sequence (e.g., $b_{479} \ldots b_{288}a_{287} \ldots a_1 a_0$) using the two puncturing periods as follows:

$$b_{479} \ldots b_{432} \underbrace{xx \ldots x}_{48 \text{ (2nd period)}} b_{383} \ldots b_{289}b_{288}a_{287} \ldots a_{97}a_{96} \underbrace{xxx \ldots x}_{48 \text{ (1st period)}} a_{47} \ldots a_1 a_0$$

and generates the following sequence or codeword $$\underbrace{b_{469} \ldots b_{432}b_{383} \ldots b_{288}a_{287}}_{144} \underbrace{\ldots a_{97}a_{96}a_{47} \ldots a_1 a_0}_{240}$$

that may be processed by the TX driver 890 to generate a transmit signal.

Note that the examples provided above are exemplary, and other desired forms of bit-filling, encoding, shortening, and puncturing or encoding and puncturing may alternatively be performed in other embodiments using different operational parameters such as puncturing period, puncturing size, puncturing start position, number of fill bits, periodicities of puncturing, etc. in other embodiments.

Note that the operations of the various functional blocks, components, etc. within FIG. 8A, FIG. 8B, and FIG. 8C may be performed within communication device 110. For example, communication interface 320 of device 110 may be configured to perform the operations of the transmit (TX) driver 890. The processor 330 of device 110 may be configured to perform bit filling, LDPC encoding, shortening, puncturing, and/or other related operations as described in these diagrams.

Figures 9A, 9B, 9C:
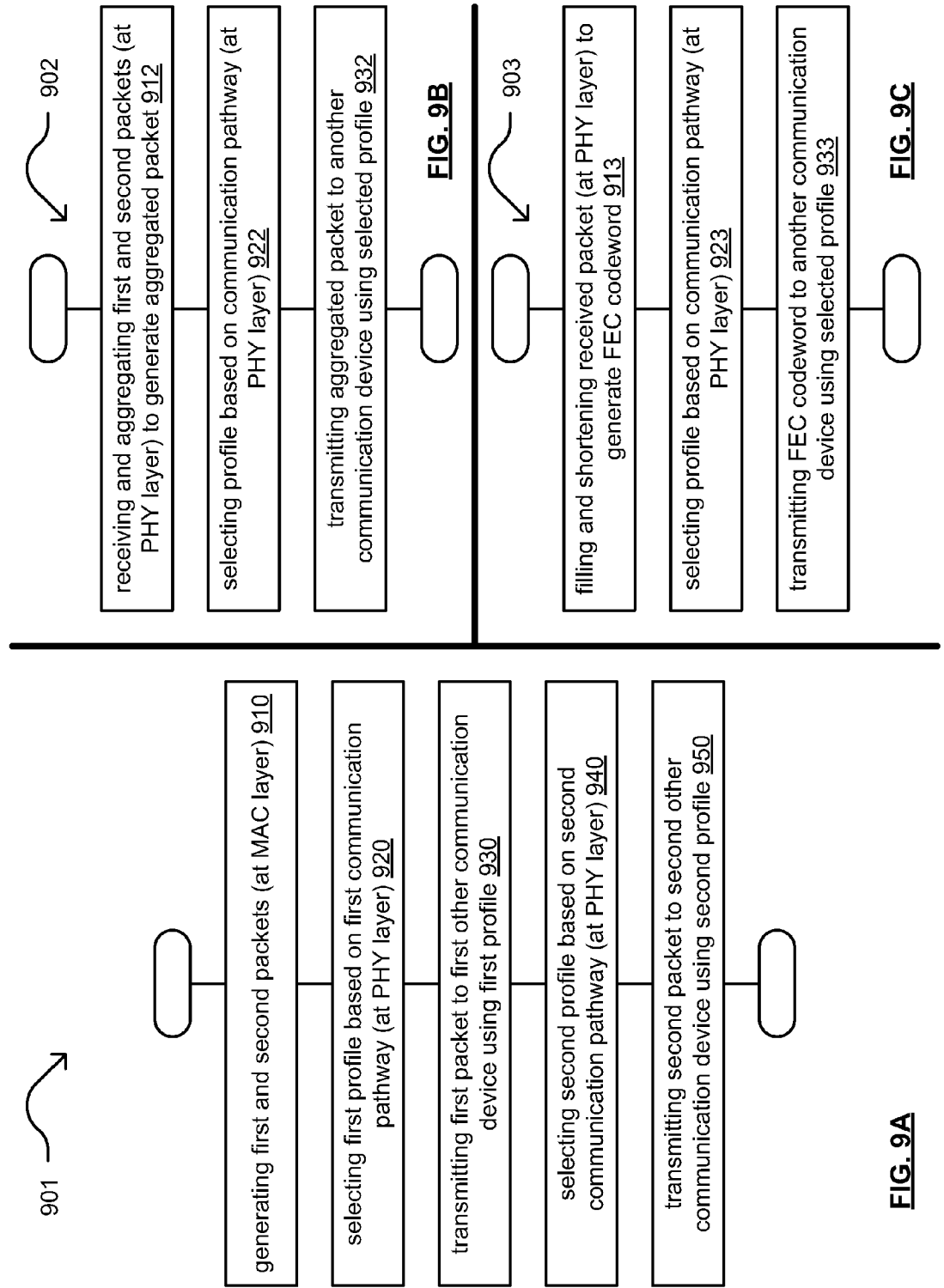
FIG. 9A is a diagram illustrating an embodiment of a method for execution by one or more communication devices.
FIG. 9B is a diagram illustrating another embodiment of a method for execution by one or more communication devices.
FIG. 9C is a diagram illustrating another embodiment of a method for execution by one or more communication devices.

FIG. 9A is a diagram illustrating an embodiment of a method 901 for execution by one or more communication devices. The method 901 begins by generated first and second packets (block 910). This packet generation may be performed at the MAC layer of a communication protocol abstraction layer stack, and may be performed by a MAC processor implemented within a communication device. The method 901 then continues by selecting a first profile based on one or more characteristics of a first communication pathway between the device performing method 901 and a first other device (block 920). This profile selection may be performed at the PHY layer of a communication protocol abstraction layer stack, and may be performed by a PHY processor implemented within a communication device.

The method 901 then operates by transmitting the first packet to the first other device using the first selected profile (block 930).

The method 901 then operates by selecting a second profile based on one or more characteristics of a second communication pathway between the device performing method 901 and a second other device (block 940). As above with respect to the first profile selection, this second profile selection may be performed at the PHY layer of a communication protocol abstraction layer stack, and may be performed by a PHY processor implemented within a communication device. The method 901 then operates by transmitting the second packet to the second other device using the second selected profile (block 950).

FIG. 9B is a diagram illustrating another embodiment of a method 902 for execution by one or more communication devices. The method 902 operates by receiving and aggregating first and second packets to generate an aggregated packet (block 912). The method 902 then operates by selecting a profile based on one or more characteristics of a communication pathway between the device performing method 902 and a recipient device (block 922). The packet aggregation and profile selection may be performed at the PHY layer of a communication protocol abstraction layer stack, and may be performed by a PHY processor implemented within a communication device. The method 902 then operates by transmitting the aggregated packet to the other recipient device using the selected profile (block 932). Note also, when operating using an aggregation method such as based on method 902, if a certain number of packets are not received after a certain amount of time, then the method 902 may transmit those received packets even though the number of received packets may not correspond to a particular desired size (e.g., an FEC codeword size). Such a period of time (e.g., time-out) may be predetermined, fixed, or adaptively determined based on any number of considerations.

FIG. 9C is a diagram illustrating another embodiment of a method 903 for execution by one or more communication devices. The method 903 operates by filling and shortening a received packet to generate an FEC codeword (block 913). The method 903 then operates by selecting a profile based on one or more characteristics of a communication pathway between the device performing method 903 and a recipient device (block 923). The filling and shortening and profile selection may be performed at the PHY layer of a communication protocol abstraction layer stack, and may be performed by a PHY processor implemented within a communication device. The method 903 then operates by transmitting the FEC codeword to the other recipient device using the selected profile (block 933).

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments of an invention have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The one or more embodiments are used herein to illustrate one or more aspects, one or more features, one or more concepts, and/or one or more examples of the invention. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module includes a processing module, a processor, a functional block, hardware, and/or memory that stores operational instructions for performing one or more functions as may be described herein. Note that, if the module is implemented via hardware, the hardware may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure of an invention is not limited by the particular examples disclosed herein and expressly incorporates these other combinations.

What is claimed is:

1. A communication device comprising:
   a media access control (MAC) processor configured to generate a plurality of packets; and
   a physical layer (PHY) processor that is coupled to the MAC processor and configured to:
      select a first profile from a plurality of profiles based on at least one characteristic of a first communication pathway extending between a communication interface of the PHY processor of the communication device and a first other communication device, wherein the first profile includes a first modulation coding set (MCS) and at least one of a first forward error correction (FEC) code or first error checking and correction (ECC) code or a first number of bits per symbol per orthogonal frequency division multiplexing (OFDM) sub-carrier or OFDM sub-carrier mapping;
      transmit from the PHY processor and via the first communication pathway a first packet of the plurality of packets to the first other communication device using the first profile;
      select a second profile from the plurality of profiles based on at least one characteristic of a second communication pathway extending between the communication interface of the PHY processor of the communication device and a second other communication device, wherein the second profile includes a second modulation coding set (MCS) and at least one of a second FEC code or second ECC code or a second number of bits per symbol per OFDM sub-carrier or OFDM sub-carrier mapping;
      transmit from the PHY processor and via the second communication pathway a second packet of the plurality of packets to the second other communication device using the second profile;
      add one or more zero-valued fill bits to the first packet to generate a filled packet
      encode the filled packet using the first FEC code or the second FEC code to generate an FEC codeword;
      shorten the one or more zero-valued fill bits from the FEC codeword; and
      transmit the FEC codeword to the first other communication device using the first profile.

2. The communication device of claim 1 further comprising:
   the PHY processor configured to:
      aggregate the first packet of the plurality of packets and a third packet of the plurality of packets to generate an aggregated packet; and
      transmit the aggregated packet to the first other communication device using the first profile.

3. The communication device of claim 1, wherein the at least one characteristic of the first communication pathway or the at least one characteristic of the second communication pathway corresponds to at least one of signal to noise ratio (SNR), signal to interference noise ratio (SINR), noise, interference, a maximum supported bit or symbol rate, a minimum supported bit or symbol rate, a prior operational history, a current operational history, a future expected operational history, or a type of communication media.

4. The communication device of claim 1 further comprising:
   the PHY processor configured to:
      transmit the first packet using the first number of bits per symbol per OFDM sub-carrier using a first subset of orthogonal frequency division multiplexing (OFDM) sub-carriers based on the first profile; and
      transmit the second packet using the second number of bits per symbol per OFDM sub-carrier using a second subset of OFDM sub-carriers based on the second profile.

5. The communication device of claim 1 further comprising:
   the PHY processor configured to transmit an orthogonal frequency division multiple access (OFDMA) frame to the first other communication device and the second other communication device that includes the first packet modulated on a first subset of OFDM sub-carriers based on the first profile and the second packet modulated on a second subset of OFDM sub-carriers based on the second profile.

6. The communication device of claim 1 further comprising:
   the PHY processor configured to:
      transmit the first packet of the plurality of packets to the first other communication device using the first profile based on unicast;
      transmit the second packet of the plurality of packets to the second other communication device using the second profile based on unicast; and
      transmit another packet to the first and second other communication devices using another profile based on multicast.

7. The communication device of claim 1 further comprising:
a cable headend transmitter or a cable modem termination system (CMTS), wherein the first and second other communication devices are first and second cable modems.

8. The communication device of claim 1 further comprising:
the PHY processor configured to support communications within at least one of a satellite communication system, a wireless communication system, a wired communication system, a fiber-optic communication system, or a mobile communication system.

9. A communication device comprising:
a media access control (MAC) processor configured to generate a plurality of packets; and
a physical layer (PHY) processor that is coupled to the MAC processor and configured to:
select a first profile from a plurality of profiles based on at least one characteristic of a first communication pathway extending between a communication interface of the PHY processor of the communication device and a first other communication device, wherein the first profile includes a first modulation coding set (MCS) and at least one of a first forward error correction (FEC) code or first error checking and correction (ECC) code or a first number of bits per symbol per orthogonal frequency division multiplexing (OFDM) sub-carrier or OFDM sub-carrier mapping;
aggregate two or more packets of the plurality of packets to generate an aggregated packet;
transmit from the PHY processor and via the first communication pathway the aggregated packet to the first other communication device using the first profile;
select a second profile from the plurality of profiles based on at least one characteristic of a second communication pathway extending between the communication interface of the PHY processor of the communication device and a second other communication device, wherein the second profile includes a second modulation coding set (MCS) and at least one of a second FEC code or second ECC code or a second number of bits per symbol per OFDM sub-carrier or OFDM sub-carrier mapping;
add one or more zero-valued fill bits to a packet of the plurality of packets to generate a filled packet;
encode the filled packet using the first FEC code or the second FEC code to generate an FEC codeword;
shorten the one or more zero-valued fill bits from the FEC codeword; and
transmit from the PHY processor and via the second communication pathway the FEC codeword to the second other communication device using the second profile.

10. The communication device of claim 9 further comprising:
the PHY processor configured to:
transmit the aggregated packet using the first number of bits per symbol per OFDM sub-carrier using a first subset of orthogonal frequency division multiplexing (OFDM) sub-carriers based on the first profile; and
transmit the FEC codeword using the second number of bits per symbol per OFDM sub-carrier using a second subset of OFDM sub-carriers based on the second profile.

11. The communication device of claim 9 further comprising:
the PHY processor configured to:
transmit the aggregated packet to the first other communication device using the first profile based on unicast;
transmit the FEC codeword to the second other communication device using the second profile based on unicast; and
transmit another packet to the first and second other communication devices using another profile based on multicast.

12. The communication device of claim 9 further comprising:
a cable headend transmitter or a cable modem termination system (CMTS), wherein the first and second other communication devices are first and second cable modems.

13. The communication device of claim 9 further comprising:
the PHY processor configured to support communications within at least one of a satellite communication system, a wireless communication system, a wired communication system, a fiber-optic communication system, or a mobile communication system.

14. A method for execution by a communication device, the method comprising:
operating a media access control (MAC) processor of the communication device to generate a plurality of packets; and
operating a physical layer (PHY) processor of the communication device that is coupled to the MAC processor to:
select a first profile from a plurality of profiles based on at least one characteristic of a first communication pathway extending between a communication interface of the PHY processor of the communication device and a first other communication device, wherein the first profile includes a first modulation coding set (MCS) and at least one of a first forward error correction (FEC) code or first error checking and correction (ECC) code or a first number of bits per symbol per orthogonal frequency division multiplexing (OFDM) sub-carrier or OFDM sub-carrier mapping;
transmit from the PHY processor and via the first communication pathway a first packet of the plurality of packets to the first other communication device using the first profile;
select a second profile from the plurality of profiles based on at least one characteristic of a second communication pathway extending between the communication interface of the PHY processor of the communication device and a second other communication device, wherein the second profile includes a second modulation coding set (MCS) and at least one of a second FEC code or second ECC code or a second number of bits per symbol per OFDM sub-carrier or OFDM sub-carrier mapping;
transmit from the PHY processor and via the second communication pathway a second packet of the plurality of packets to the second other communication device using the second profile;
add one or more zero-valued fill bits to the first packet to generate a filled packet;
encode the filled packet using the first FEC code or the second FEC code to generate an FEC codeword;

shorten the one or more zero-valued fill bits from the FEC codeword; and transmit the FEC codeword to the first other communication device using the first profile.

15. The method of claim 14 further comprising:

aggregating the first packet of the plurality of packets and a third packet of the plurality of packets to generate an aggregated packet; and transmitting the aggregated packet to the first other communication device using the first profile.

16. The method of claim 14, wherein the at least one characteristic of the first communication pathway or the at least one characteristic of the second communication pathway corresponds to at least one of signal to noise ratio (SNR), signal to interference noise ratio (SINR), noise, interference, a maximum supported bit or symbol rate, a minimum supported bit or symbol rate, a prior operational history, a current operational history, a future expected operational history, or a type of communication media.

17. The method of claim 14 further comprising:

transmitting the first packet using the first number of bits per symbol per OFDM sub-carrier using a first subset of orthogonal frequency division multiplexing (OFDM) sub-carriers based on the first profile; and transmitting the second packet using the second number of bits per symbol per OFDM sub-carrier using a second subset of OFDM sub-carriers based on the second profile.

18. The method of claim 14 further comprising:

transmitting the first packet of the plurality of packets to the first other communication device using the first profile based on unicast;

transmitting the second packet of the plurality of packets to the second other communication device using the second profile based on unicast; and transmitting another packet to the first and second other communication devices using another profile based on multicast.

19. The method of claim 14, wherein the communication device is a cable headend transmitter or a cable modem termination system (CMTS), and the first and second other communication devices are first and second cable modems.

20. The method of claim 14 further comprising:

operating the PHY processor of the communication device to support communications within at least one of a satellite communication system, a wireless communication system, a wired communication system, a fiber-optic communication system, or a mobile communication system.

* * * * *